US008976285B2

(12) United States Patent
Jeong

(10) Patent No.: US 8,976,285 B2
(45) Date of Patent: Mar. 10, 2015

(54) PHOTOGRAPHING DEVICE AND METHODS THEREOF

(75) Inventor: Dae-hyun Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/343,194

(22) Filed: Jan. 4, 2012

(65) Prior Publication Data

US 2012/0176508 A1 Jul. 12, 2012

(30) Foreign Application Priority Data

Jan. 6, 2011 (KR) .............................. 2011-0001493

(51) Int. Cl.
*H04N 5/222* (2006.01)
*H04N 5/225* (2006.01)
*H04N 5/232* (2006.01)

(52) U.S. Cl.
CPC ......... *H04N 5/23293* (2013.01); *H04N 5/2251* (2013.01)
USPC ................. 348/333.06; 348/333.12; 348/373; 348/376

(58) Field of Classification Search
CPC . H04N 5/2251; H04N 5/2252; H04N 5/2259; H04N 5/23293; H04N 5/23296
USPC ......................... 348/333.06, 333.12, 373–376
See application file for complete search history.

(56) References Cited

U.S. PATENT DOCUMENTS

| 7,151,571 | B2 * | 12/2006 | Yip ................................ 348/373 |
| 7,486,323 | B2 | 2/2009 | Lee et al. |
| 7,720,376 | B2 * | 5/2010 | Weinberg et al. .............. 396/301 |
| 2004/0201595 | A1 * | 10/2004 | Manchester ................... 345/649 |
| 2005/0190281 | A1 | 9/2005 | Lee et al. |
| 2005/0200752 | A1 * | 9/2005 | Kim ............................... 348/376 |
| 2006/0044268 | A1 * | 3/2006 | Robin et al. ................... 345/158 |
| 2006/0051070 | A1 * | 3/2006 | Itsukaichi ...................... 386/117 |
| 2006/0104628 | A1 * | 5/2006 | Hasegawa et al. ............. 396/287 |
| 2006/0257142 | A1 * | 11/2006 | Tanaka ........................... 396/529 |
| 2007/0103443 | A1 * | 5/2007 | Park et al. ...................... 345/169 |
| 2008/0036876 | A1 * | 2/2008 | Kaneda et al. .............. 348/230.1 |
| 2008/0292301 | A1 * | 11/2008 | Kikuchi ......................... 396/354 |

FOREIGN PATENT DOCUMENTS

| JP | 2004-266693 | 9/2004 |
| JP | 2005-101714 | 4/2005 |
| JP | 2009-260521 | 11/2009 |
| JP | 2009260521 A * | 11/2009 ............... H04R 1/40 |
| KR | 10-0611182 | 8/2006 |

* cited by examiner

*Primary Examiner* — Sinh Tran
*Assistant Examiner* — Xi Wang
(74) *Attorney, Agent, or Firm* — Staas & Halsey LLP

(57) ABSTRACT

A photographing device includes a photographing unit which generates a photographing data by performing photographing with a photographing component, a display unit which displays an image which is photographed in the photographing unit, a sensor unit which senses whether the photographing device rotates, and a control unit which changes a reading order of the photographing component according to a rotation direction and a rotation degree when the photographing device rotates in a recording stand-by mode state, and controls the photographing unit in order to generate the photographing data by maintaining the reading order if the photographing device rotates in a recording mode state.

38 Claims, 10 Drawing Sheets

PHOTOGRAPHING DEVICE AND METHODS THEREOF

CROSS-REFERENCE TO RELATED APPLICATIONS

This application claims priority under 35 U.S.C. §119(a) from Korean Patent Application No. 2011-0001493, filed on Jan. 6, 2011, in the Korean Intellectual Property Office, the contents of which are incorporated herein by reference in their entirety.

BACKGROUND OF THE INVENTION

1. Field of the Invention

The present general inventive concept relates to a photographing device and display methods thereof. More particularly, the present general inventive concept relates to a photographing device usable for a two-hand grip and display methods thereof.

2. Description of the Related Art

Due to the development of electronic technologies, photographing devices such as digital cameras or camcorders, or various portable devices such as smart phones and tablet PCs, are increasingly used.

In case of a photographing device, a hand grip may be used. Thus, designing an ergonomic handle (or a grip) which enables a stable photographing and is easy to hold is important. However, a display space and a location of the handle and the display component may be limited in favor of a small grip.

In most cases, a grip is disposed on a right-hand portion of the photographing device as most users are right-handers and a display component is disposed on a left-hand portion, opposite to the grip. Accordingly, it can be inconvenient for left-handers to use the right-handed photographing device.

SUMMARY OF THE INVENTION

The present general inventive concept provides a photographing device which is usable by a left-hander and a right-hander and display methods thereof.

Additional features of the present general inventive concept will be set forth in part in the description which follows and, in part, will be obvious from the description, or may be learned by practice of the general inventive concept.

Features of the present general inventive concept may be realized by a photographing device that includes a photographing unit which generates a photographing data by performing photographing with an photographing component, a display unit which displays an image which is photographed in the photographing unit, a sensor unit which senses whether the photographing device rotates, and a control unit which changes a reading order of the photographing component according to a rotation direction and rotation degree when the photographing device rotates in a recording stand-by mode state, and controls the photographing unit in order to generate the photographing data by maintaining the reading order when the photographing device rotates in a recording mode state.

The display unit displays an icon with the image, and the control unit may control the display unit so that at least one of a display location and a display direction of the icon is changed according to the rotation direction and rotation degree, when the photographing device rotates in the recording stand-by mode state.

The photographing device may further include a grip unit which is disposed on a first side unit of the photographing device, and a plurality of control keys which are disposed on a rear side of the photographing device, wherein the display unit may be disposed on a second side unit which is an opposite side of the grip unit.

The plurality of control keys may be disposed in a bilaterally symmetrical shape, wherein functions which are mapped to a plurality of control keys for each one may be changed according to the rotation direction and the rotation degree of the photographing device.

The plurality of control keys may include a center key which is disposed on a center of the rear side, a first control key which is disposed toward the first side unit based on the center key on the rear side, a second control key which is disposed toward the second side unit based on the center key on the rear side, a third control key which is disposed on an upper portion based on the center key on the rear side, and a fourth control key which is disposed on a lower portion based on the center key on the rear side.

In addition, the control unit changes functions which are mapped to a plurality of control keys for each one so that a function of the first control key and a function of the second control key may be exchanged and a function of the third control key and a function of the fourth control key may be exchanged, when the photographing device rotates at 180° angle.

The photographing device may further include a sliding button on the rear side of the photographing device. The sliding button which is located on a center portion of a groove which is provided on a rear side of the photographing device is slidable in one direction or in another direction along the groove and returns to the center portion when a sliding is completed, wherein the control unit may perform zoom-in or zoom-out according to a sliding direction when the sliding is carried out, and functions which are mapped to the sliding direction may be changed if the photographing device rotates at a 180° angle.

The control unit may rotate the reading order at one angle among a 90° angle, a 180° angle, and a 270° angle, according to the rotation direction and the rotation degree of the photographing device under the recording stand-by mode.

In addition, the photographing device may further include a storing unit. The control unit may store a first photographing data which is generated in photographing values which are read according to the reading order that is stored in the storing unit, when the photographing device rotates in the recording mode state, and may generate as photographing values read according to the changed reading order the second photographing data when a recording command is input in the recording stand-by mode state.

The first photographing data displays a rotation image which is rotated according to a rotation direction and a rotation degree of the photographing device and the second photographing data displays a normal image which is displayed normally by compensating rotation of the photographing device.

Features of the present general inventive concept may also be realized by a method of photographing of a photographing device that includes performing photographing by using a photographing component, detecting a rotation state that the photographing device rotates around a photographing direction, and generating photographing data by changing a reading order of the photographing component according to a rotation direction and a rotation degree when the photographing device is in a recording stand-by mode state and maintaining a reading order of the photographing component when the photographing device is in a recording mode state.

The photographing method may further include displaying an icon and an image which is photographed, and changing at least one of the display location and the display direction of the icon according to the rotation direction and the rotation degree, when the photographing device rotates in the recording stand-by mode state.

The photographing device may further include a grip unit which is disposed on a first side unit of the photographing device, and a plurality of control keys which are disposed on a rear side of the photographing device. The functions which are mapped to the plurality of control keys may be changed according to the rotation direction and the rotation degree of the photographing device.

The plurality of control keys may include a center key which is disposed on a center of the rear side, a first control key which is disposed toward the first side unit based on the center key on the rear side, a second control key which is disposed toward the second side unit based on the center key on the rear side, a third key which is disposed on an upper portion based on the center key on the rear side, and a fourth key which is disposed on a lower portion based on the center key on the rear side.

Changing the functions mapped to the plurality of control keys may include exchanging a function of the first control key and a function of the second control key, and exchanging a function of the third control key and a function of the fourth control key, when the photographing device rotates at a 180° angle.

The photographing method may further include changing a sliding direction of a sliding button on the rear side of the photographing device and functions mapped to the sliding direction, when the photographing device rotates at a 180° angle. In addition, the sliding button which is located on a center portion of a groove which is provided on the rear side of the photographing device is slidable in one direction or in another direction along the groove, may instruct to perform zoom-in or zoom-out according to a sliding direction, and may turn back to the center portion when the sliding is completed.

In addition, generating the photographing data may include rotating the reading order at one angle among a 90° angle, a 180° angle, and a 270° angle, according to the rotation direction and the rotation degree of the photographing device when the photographing device rotates under the recording stand-by mode.

The photographing method may further include storing a first photographing data which is generated by photographing values which are read according to the reading order when the photographing device rotates in the recording mode state, and generating and storing a second photographing data by photographing values which are read according to the changed reading order when a recording command is input in the recording stand-by mode.

The first photographing data may display a rotated image which is rotated according to the rotation direction and rotation degree of the photographing device and the second photographing data may display a normal image which is displayed normally by compensating rotation of the photographing device.

Features of the present general inventive concept may also include a method of photographing of a photographing device which has a grip unit which is disposed on a first side of the photographing device, and a display unit which is disposed on a second side opposite to the first side, and the method may include determining whether a grip of the photographing device is changed by a rotation of the photographing device at a 180° angle based on a photographing direction, determining a mode of the photographing device when the grip of the photographing device is changed, generating and storing a photographing data by using photographing values which are generated from a photographing component which is provided in the photographing device, when the photographing device is in a recording mode state, and generating a photographing data by reading photographing values which are generated from the photographing component in a reverse direction, when the photographing device is in a recording stand-by mode state, and displaying the photographing data and at least one icon of which a display location and a display direction are changed according to a rotation state of the photographing device.

According to the various exemplary embodiments of the present general inventive concept, it is possible for both a left-hander and a right-hander to use a photographing device easily.

Features of the present general inventive concept may also include a photographing device, including a photographing unit to receive an image and to output electrical signals corresponding to the received image, a sensor to detect a rotation angle of the photographing device around an axis corresponding to a photographing direction, and a controller to change an orientation at which the received image is stored according to a detected rotation angle of the sensor.

The controller may change the orientation of the received image by changing an order in which the electrical signals are read from the photographing unit.

The photographing device may further include a storing unit to store the received image by storing the electrical signals from the photographing unit, and the controller may detect a mode of the photographing device and may store the electrical signals to the storing unit without changing the order in which the electrical signals are read from the photographing unit when the photographing device is in a recording mode, and the controller may change the order in which the electrical signals are read from the photographing unit without storing the electrical signals in the storing unit when the photographing device is in a recording stand-by mode.

The controller may reverse an order in which the electrical signals are read from the photographing unit when the sensor detects a rotation angle of at least a predetermined degree.

The predetermined degree may be one of 90 degrees and 180 degrees.

Features of the present general inventive concept may also be realized by a photographing device including a photographing unit to receive an image and to output electrical signals corresponding to the received image, a sensor to detect a rotation angle of the photographing device around an axis corresponding to a photographing direction, a display to display a photographed image and at least one display feature, and a controller to change an orientation of at least one of the display feature and a recorded image according to the detected rotation angle of the photographing device.

The display feature may include an icon displayed on the display.

The controller may change the orientation of at least one of the icon and the recorded image when the photographing device is in a recording stand-by mode according to the detected rotation angle of the photographing device.

The controller may change the orientation of the icon according to the detected rotation angle of the photographing device when the photographing device is in a recording mode, and the controller may not change the orientation of the recorded image according to the detected rotation angle of the photographing device when the photographing device is in the recording mode.

The controller may change the location of the icon on the display according to the detected rotation angle of the photographing device.

Features of the present general inventive concept may also be realized by a photographing device, including a photographing unit to receive an image and to output electrical signals corresponding to the received image, a sensor to detect a rotation angle of the photographing device around an axis corresponding to a photographing direction, a plurality of keys located on a rear surface of the photographing device opposite the photographing unit to control the photographing device, and a controller to change at least one of functions assigned to the plurality of keys and a recorded image according to the detected rotation angle of the photographing device.

The keys may be located symmetrically with respect to a first axis and a second axis perpendicular to the first axis, and a function of a first key and a second key of the plurality of keys may be switched with each other when the controller determines that the photographing device is rotated to a predetermined degree, the first key and the second key being symmetrical with each other with respect to at least one of the first and second axes.

The plurality of keys may include a multi-part key including at least a first part to perform a first function and a second part to perform a second function, and a function of the first part and the second part of the multi-part key may be switched with each other when the controller determines that the photographing device is rotated to a predetermined degree, the first part and the second part being symmetrical with each other with respect to at least one of the first and second axes.

The multi-part key may be a sliding key that performs a first function when slid in a first direction and may perform a second function when slid in a second direction opposite the first direction.

Features of the present general inventive concept may also be realized by a photographing device including a photographing unit to receive an image and to output electrical signals corresponding to the received image, a sensor to detect a rotation angle of the photographing device around an axis corresponding to a photographing direction, a plurality of keys located on a rear surface of the photographing device opposite the photographing unit to control the photographing device, a display to display the received image, a storage unit to store the received image when the photographing device is in a recording mode, and a controller to change at least one of functions assigned to the plurality of keys, an orientation of an icon displayed on the display, and an orientation of a recorded image according to the detected rotation angle of the photographing device.

The controller may determine whether the photographing device is in the recording mode or a stand-by mode and may change the at least one of functions assigned to the plurality of keys, the orientation of an icon displayed on the display, and the orientation of a recorded image according to the detected rotation angle of the photographing device only when the photographing device is in the recording stand-by mode.

Features of the present general inventive concept may also be realized by a method of controlling a photographing device, the method including detecting a rotation angle of the photographing device and changing at least one of functions assigned to a plurality of keys, an orientation of an icon displayed by the photographing device, and an orientation of an image recorded by the photographing device according to the detected rotation angle of the photographing device.

Changing the orientation of the image recorded by the photographing device may include changing an order in which electrical signals corresponding to a received image are read from a photographing unit into a storage unit to store the received image.

Changing at least one of functions assigned to the plurality of keys may include switching the functions of keys located on a rear surface of the photographing device opposite a front surface that receives an image to be recorded, the keys being symmetrical to each other on the rear surface of the photographing device.

Changing at least one of functions assigned to the plurality of keys may include changing the functions assigned to first and second parts of a multi-part key, the first and second parts being symmetrical to each other on the rear surface of the photographing device.

Changing an orientation of an icon displayed by the photographing device may include changing an order in which a plurality of icons are displayed on a display of the photographing device.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
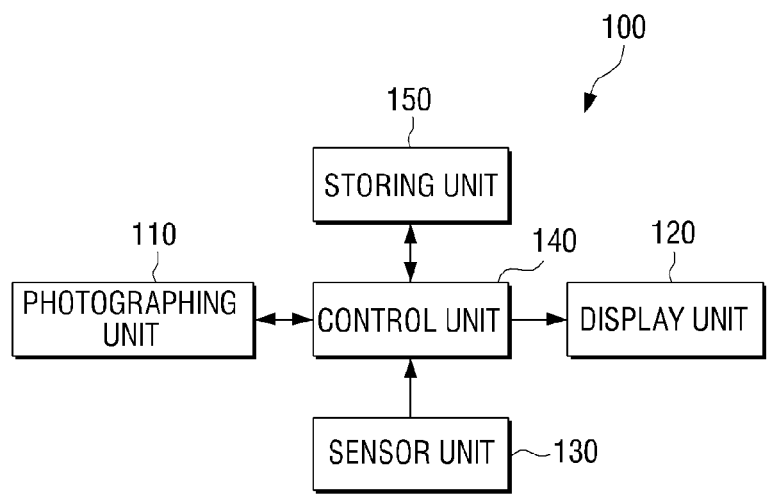
FIGS. 1A and 1B are block diagrams to illustrate a configuration of a photographing device according to various exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1A is a block diagram to describe a configuration of a photographing device according to a variety of exemplary embodiments of the present general inventive concept. The photographing device 100 represents a device that makes an image by receiving light from a subject via a lens with a photographing device, and converts the image to an electronic signal, thereby recording on or transmitting to a recording media such as a magnetic tape or a memory card.

A photographing device of FIG. 1A may be a video recording device (such as a camcorder) photographing a video data, or the photographing device may be realized as a camera that photographs a still image and other various devices such as a tablet PC, a PDA, or a cellular phone which have a photographing function.

According to FIG. 1A, the photographing device includes a photographing unit 110, a display unit 120, a sensor unit 130, a control unit 140, and a storing unit 150.

The photographing unit 110 photographs by using light reflected from a subject and outputs an image data. The image data of the present general inventive concept includes not only a simple still image data but also a video data. The photographing unit 110 may be realized in various forms including a variety of components such as a photographing component, a lens, and an aperture.

A CCD imaging sensor or a CMOS imaging sensor may be used as a photographing component. Namely, the photographing unit 110 may perform photographing by using an array imaging sensor (bi-dimensional imaging sensor). The CCD, the abbreviation for Charge-Coupled Device, is a sensor which transforms a light into an electric charge, thereby receiving an image. The CCD comprises a circuit where a plurality of condensers are connected each other in pairs.

The CMOS connects MOSFET of a P channel and a N channel in series between a power and a voltage, and is a sensor comprises a configuration of an integrated circuit which connects input to gates of two MOSFET together and connects output to between drains of two MOSFET.

The display unit 120 displays an image photographed from the photographing unit 110. Since the photographing unit 110 outputs an image corresponding to a reflected beam since a photographing menu has been selected, the display unit 120 may display the image photographed from a photographing unit 110 even before a start of recording, or even in a recording stand-by mode state. A user may select an object of photographing while he/she watches a screen of the display unit 120, determine and adjust a photographing condition, and then start photographing. In other words, the photographing device 100 may operate in a recording state and a recording stand-by state. The recording state is the state in which the photographing unit 110 outputs image data to the control unit 140, and the image data is output to the display unit 120, and the image data is recorded in the storing unit 150 to be displayed at a later time. Unlike the recording state, in the recording stand-by state, the image data is not recorded in the storing unit 150. However, the image data may still be viewed by a user on the display unit 120 to allow the user to preview an image that will be recorded, and to change any desired settings with respect to the image.

The display unit 120 may display a subject as it is seen, although the photographing device may be rotated and an up and down relationship may be reversed accordingly. In other words, although an image displayed on the screen 121 of the display unit 120 always maintains an up and down relationship as viewed by the user, the image is recorded to have an up and down relationship with respect to the photographing device 100. Thus, when the recorded image is displayed after recording is complete, the image may have an angle corresponding to the angle at which the photographing device 100 is rotated. However, according to the present general inventive concept, the photographing device 100 may control a recording process so that a recorded image may have an up and down relationship that is the same as that viewed by the user, even after the photographing device 100 has been rotated.

The sensor unit 130 senses whether the photographing device rotates. The rotation may represent rotation in a clockwise direction or in a counterclockwise direction with respect to an axis P defined by a photographing direction. In other words, the rotation may correspond to an angle of pitch of the photographing device 100. Namely, if the photographing device is made for a right-hander, the display unit 120 is disposed on a left side of the photographing device and a grip (not shown) is disposed on a right side which is opposite side to the left side. A left-hander may rotate the photographing device in a clockwise direction or in a counterclockwise direction at a 180° angle in order to use the photographing device. Accordingly, the photographing device may be reversed upside down in order that the grip may face the left and the display unit 120 may face the right. The sensor unit 130 senses whether this rotation has occurred.

In the present specification and claims, the term right-handed grip position and similar terms refer to a position of the photographing device 100 in which the grip 150 is located on the right side of the photographing device 100 so that a user who is right-handed can insert a hand into the grip 150 to hold the photographing device 100 in the hand while the lens 111 of the photographing unit 110 faces away from the user. Likewise, the term left-handed grip position and similar terms refer to a position of the photographing device 100 in which the grip 150 is located on the left side of the photographing device 100 so that a user who is left-handed can insert a hand into the grip 150 to hold the device in the hand while the lends 111 of the photographing unit 110 faces away from the user.

The sensor unit 130 may be realized as a variety of sensors such as a gravity acceleration sensor or accelerometer, a geomagnetic sensor, and a gyro sensor.

For example, if the photographing device may be maintained in a flat state, the sensor unit 130 may use a 2-axis acceleration sensor. The 2-axis acceleration sensor comprises an x-axis acceleration sensor and a y-axis acceleration sensor which are installed perpendicular to each other. On a flat surface where the photographing device is disposed, if the x-axis acceleration sensor is in the same direction with the photographing direction and the y-axis acceleration sensor is disposed in the perpendicular direction to the direction of the x-axis acceleration sensor, the sensor unit 130 may determine whether rotation has occurred by measuring a roll angle (an angle rotating around an axis of the x-axis acceleration sensor).

The x-axis acceleration sensor and the y-axis acceleration sensor output an electric signal having a size corresponding to a degree of rotation or a degree of a lean. The sensor unit may perform normalization in order that the electric signal output from the 2-axis acceleration sensor separately may be mapped to a value within a predetermined range. The normalization may be realized according to the following equation:

$$Xt_{norm} = \frac{(Xt - Xt_{bias})}{Xt_{sf}}$$

$$Yt_{norm} = \frac{(Yt - Yt_{bias})}{Yt_{sf}}$$

$$Xt_{bias} = \frac{(Xt_{max} - Xt_{min})}{2}, Xt_{sf} = \frac{(Xt_{max} - Xt_{min})}{2}$$

$$Yt_{bias} = \frac{(Yt_{max} - Yt_{min})}{2}, Yt_{sf} = \frac{(Yt_{max} - Yt_{min})}{2}$$

Equation 1

In the equation 1, Xt and Yt represent output values of the x-axis acceleration sensor and the y-axis acceleration sensor respectively, $Xt_{norm}$ and $Yt_{norm}$ represent output values of the normalized x-axis acceleration sensor and the normalized y-axis acceleration sensor respectively, $Xt_{max}$ and $Xt_{min}$ represent a maximum value and a minimum value of the Xt respectively, and $Yt_{max}$ and $Yt_{min}$ represent a maximum value and a minimum value of the Yt respectively. $Xt_{max}$, $Xt_{min}$, $Yt_{max}$, and $Yt_{min}$ may use a value measured and stored in advance. Namely, the sensor unit 130 may further include an internal memory. Accordingly, the sensor unit 130 may sense output values of the x-axis acceleration sensor and the y-axis acceleration sensor by at least one rotation in advance and may store a maximum value and a minimum value in the memory among the output values. The stored maximum value and the minimum value are used for calculating the normalization factors for normalization such as $Xt_{bias}$, $Xt_{sf}$, $Yt_{bias}$, and $Yt_{sf}$.

The sensor unit 130 calculates the pitch angle and the roll angle by using the output values of the 2-axis acceleration sensor normalized in the normalization unit. The pitch angle and the roll angle may be calculated as the following equation:

$$\theta = \sin^{-1}(Xt_{norm})$$
$$\phi = \sin^{-1}\left(\frac{Yt_{norm}}{\cos\theta}\right)$$

Equation 2

In the equation 2, $\theta$ represents a pitch angle and $\phi$ represents a roll angle. In addition, as described above, $Xt_{norm}$ and $Yt_{norm}$ represent output values of the normalized x-axis acceleration sensor and the normalized y-axis acceleration sensor.

As described above, if an array axis of the x-axis acceleration sensor is a photographing direction, and an array axis of the y-axis acceleration sensor is perpendicular to the array axis of the x-axis acceleration sensor, the sensor unit 130 outputs $\phi$ (changed values when rotation is occurred around the x-axis acceleration sensor) as a detection result.

On the other hand, if an array axis of the y-axis acceleration sensor is a photographing direction, and an array axis of the x-axis acceleration sensor is perpendicular to the array axis of the y-axis acceleration sensor, the sensor unit 130 outputs $\phi$ (changed values when rotation is occurred around the y-axis acceleration sensor) as a detection result.

The sensor unit 130 may be realized as a 3-axis acceleration sensor. In this case, the z-axis acceleration sensor may be disposed perpendicular to a flat surface comprising the x-axis acceleration sensor and the y-axis acceleration sensor. If an array axis of the y-axis acceleration sensor is the photographing direction and an array axis of the x-axis acceleration sensor is disposed perpendicular to the array axis of the y-axis acceleration sensor, the rotation angle may be calculated as the following equation:

$$\theta = \tan^{-1}(y/z)$$

Equation 3

In the equation 3, y may represent an output value of the y-axis acceleration sensor and z may represent an output value of the z-axis acceleration sensor. The y and z may be normalized as described above and used for calculation or may be used without normalization.

Although the photographing device is disposed horizontally, the output value may be changed by a momentary movement, which may overcome by using an orientation value. The orientation value means a value that shows a current rotation state of a photographing device. The sensor unit 130 may represent the orientation value as 3 bit. For example, if the current state is 001 and rotation is occurred in x-axis direction, the orientation value may be changed like 010→011→100.

The sensor unit 130 may occur interrupt every at 0, 90, 180, and 270 degree angles and may store the 3 bit value of each angle in a register (not shown).

Accordingly, the sensor unit 130 may consider a value output from the gravity acceleration sensor and a value stored in the register, thereby determining whether rotation has occurred.

The sensor unit 130 is realized differently according to a various exemplary embodiments and detects and outputs a rotation angle (a rotation degree of the photographing device).

If the sensor unit 130 senses rotation, the control unit 140 operates differently according to a current mode of the photographing device 100.

Namely, if rotation is sensed in a recording mode, the control unit 140 generates photographed images from the photographed unit 110 as photographing data and stores the photographing data in the storing unit 150, without any particular control operation, or without changing a photographing order or a display of icons.

The storing unit 150 may be a storing device provided in the photographing device 100 itself or a storing device such as a memory card or a USB memory which are mounted on the photographing device, or externally connected to the photographing device. Accordingly, an image may be recorded.

Figure 1B:
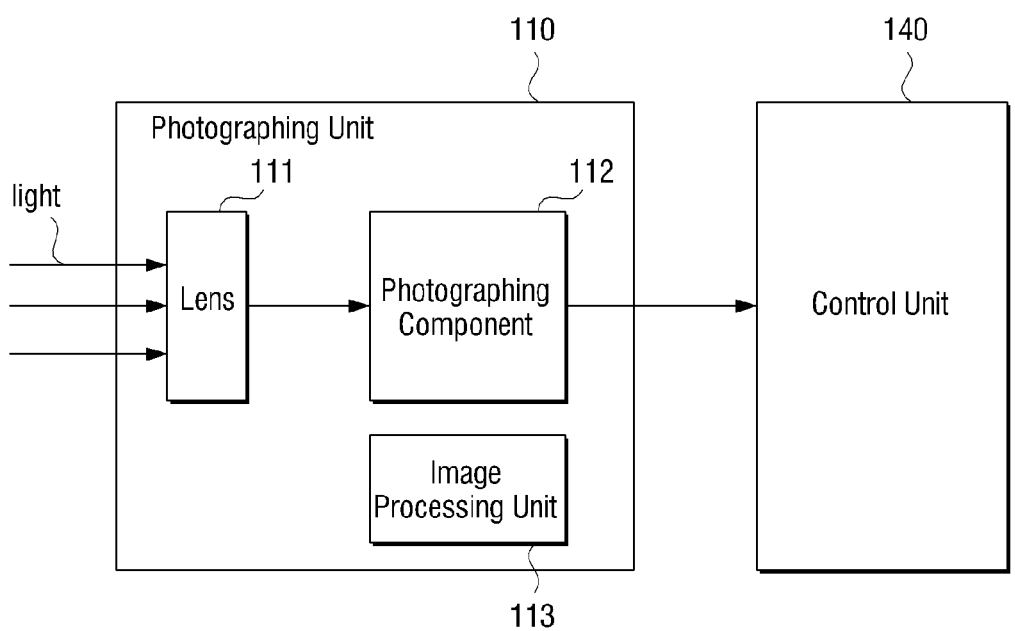

If rotation is detected in a recording stand-by mode, the control unit 140 changes a photographing order in which signals are read by the photographing component 112. Referring to FIG. 1B, the photographing unit 110 performs photographing by sequentially outputting electric signals from a photographing component 112 corresponding to a received light via a lens 111. An image processing unit 113 sequentially reads the photographing values output from the photographing component, thereby generating photographing data. If the sensor unit 130 determines that rotation of the photographing device 100 has occurred, the control unit 140 changes an order in which the image data is read from the photographing component 112 and generates photographing data. For example, if the photographing device 100 is rotated substantially 180 degrees, the image data may be read from the photographing component 112 in an order that is the reverse of when the photographing device 100 is positioned at a 0 degree angle, where a 0 degree angle is defined as one of the right-handed and the left-handed grip positions, and 180 degrees is the other of the right-handed and left-handed grip positions. Accordingly, although the photographing device 100 rotates at 180° angle, the photographing device generates and stores photographing data of an image such that the image is recorded normally or right-side-up. Therefore, it is possible to photograph normally even when a left-hander uses the photographing device 100 by rotating the photographing device 100 at a 180° angle.

As described above, if a first photographing data represents photographing data when rotation has occurred in the recording mode, the first photographing data is stored as a rotated image rotated according to a rotation direction and a rotation degree of the photographing device. Namely, if the first photographing data is reproduced, then the resulting output image is displayed with the rotation direction and degree at which the photographing device was rotated in the recording mode.

On the other hand, if a second photographing data represents photographing data when rotation has occurred in the recording stand-by mode state, the second photographing data is stored by changing the reading order and thus, the second photographing data is stored as a normal image displayed normally by compensating rotation of the photographing device. Accordingly, if the second photographing data is reproduced, the output image maintains the up and down relationship of the normal image.

Figure 2:
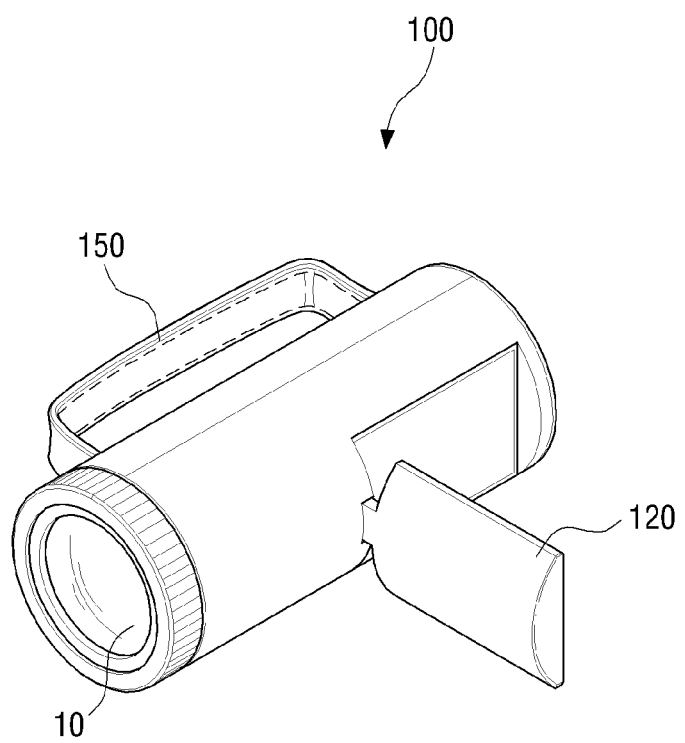
FIG. 2 is a view showing a front portion of a photographing device.

FIG. 2 represents a front side of the photographing device according to an exemplary embodiment of the present general inventive concept. According to FIG. 2, a lens 10 is disposed on the photographing device 100, a grip unit 150 is disposed on one side (hereinafter, the first side), and a display unit 120 is disposed on the other side (hereinafter, the second side). The display unit 120 is coupled to the photographing device 100 via a hinge, and may be contacted with, or folded into, the body of the photographing device 100 when the display unit 120 is not used.

Figure 3:
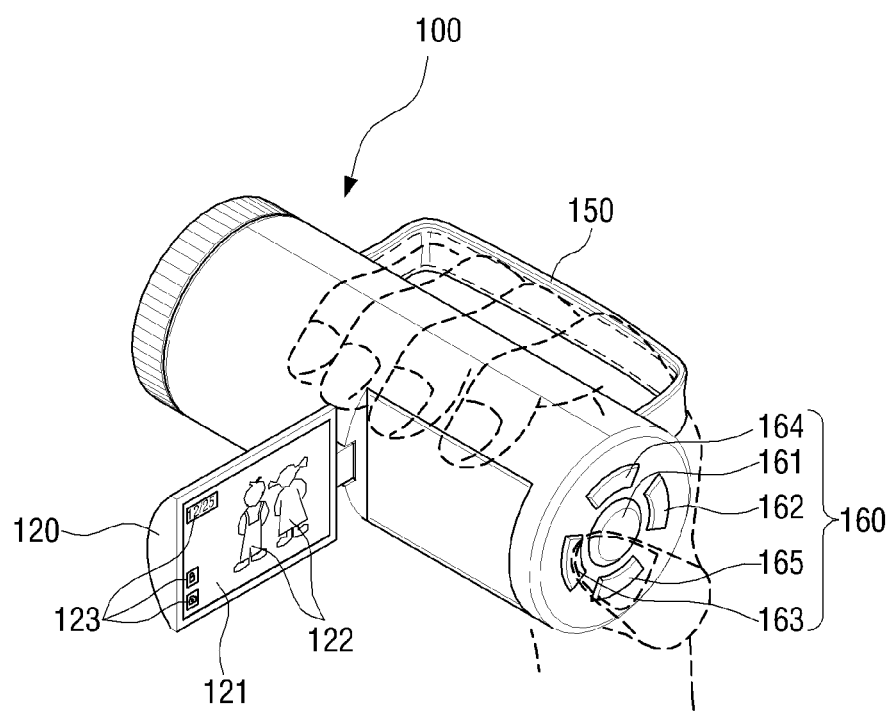
FIG. 3 is a view showing a rear portion of a photographing device.

FIG. 3 is a view showing a rear side of the photographing device of FIG. 2. As illustrated in FIG. 3, since the grip unit 150 is disposed at the right portion of the photographing device 100, a right-hander may grasp the photographing device 100 by inserting a right hand into the grip unit 150.

On the display unit 120, a screen 121 may face the rear side of the photographing device 100. On a screen 121, a photographing image (an image corresponding to a currently reflected light via the lens 10) is displayed. According to FIG. 3, a photographing image 122 and an icon 123 are displayed together.

In addition, as illustrated in FIG. 3, a plurality of control keys 160 may be provided on the rear side of the photographing device 100. An arrangement of the control keys 160 may be changed variously. In FIG. 3, the control keys 160 may include a center key 161 disposed on a center of the rear side, a first control key 162 disposed toward the first side with respect to the center key 161 on the rear side, a second control key 163 disposed toward the second side with respect to the center key 161 on the rear side, a third control key 164 disposed on an upper portion with respect to the center key 161 on the rear side, and a fourth control key 165 disposed on a lower portion with respect to the center key 161 on the rear side. Accordingly, an arrangement shape and an arrangement direction of the control keys provided on the photographing device 100 may be arranged so that a left-hander and a right-hander may control the photographing device easily. Namely, the control keys may be disposed in a bilaterally symmetrical shape based on the center of the rear side.

A plurality of control keys 160 in a push type are illustrated in FIG. 3, but shapes and the number of control keys are not limited to FIG. 3 and may be changed according to a variety of exemplary embodiments of the present general inventive concept. For example, any number of keys may be located on the rear side of the photographing device 100, and the keys may be arranged symmetrically about a horizontal axis and a vertical axis.

For example, the control keys may include one main key for various selections, and a sliding button disposed on one side of the main key. The sliding button means a button slidable within a groove. The button basically locates on the center point within the groove, and if a user pushes and moves the button toward one end direction between the two end directions and releases the button, the button returns to the original position, which may be a center position, for example.

Zoom-in or zoom-out is carried out according to the sliding direction, and the degree of the zoom-in or zoom-out is differentiated according to a maintenance time in a sliding state or degree of sliding. For example, if the sliding button is slid far to the right, a zoom-out may occur faster than if the sliding button is slid a lesser distance to the right. Similarly, if the sliding button is slid to the right for a longer period of time, then the zoom-out operation may continue longer than if the sliding button is slid to the right for a shorter period of time.

The zoom-in and zoom-out operations may be carried out in the same direction with respect to a user. Specifically, on the right-handed grip, the zoom-in may be carried out if a user slides the button toward the left, and the zoom-out is carried out if the user slides the button toward the right. If the photographing device 100 is rotated so that the grip of the photographing device 100 is changed into a left-handed grip, the left side may be mapped for carrying out zoom-in and the right side may be mapped for carrying out zoom-out. This type of button or key may be called the sliding button as described above, or a restoration type toggle key different from the above. In addition, a shape of a groove may be in a circle shape surrounding the main key or in a straight line shape and the location is not also limited to one region. The button may be controlled with a sliding motion, or by pressing one side or an opposite side of the button, and the opposing sides may perform zoom-in and zoom-out operations, respectively.

According to an alternative example, the control keys may be realized as a wheel or a jog shuttle. In this case, functions are changed according to a rotation direction of the wheel or the jog shuttle, and if the photographing device 100 rotates and the grip is changed, mapping functions may be changed accordingly.

Figure 4A:
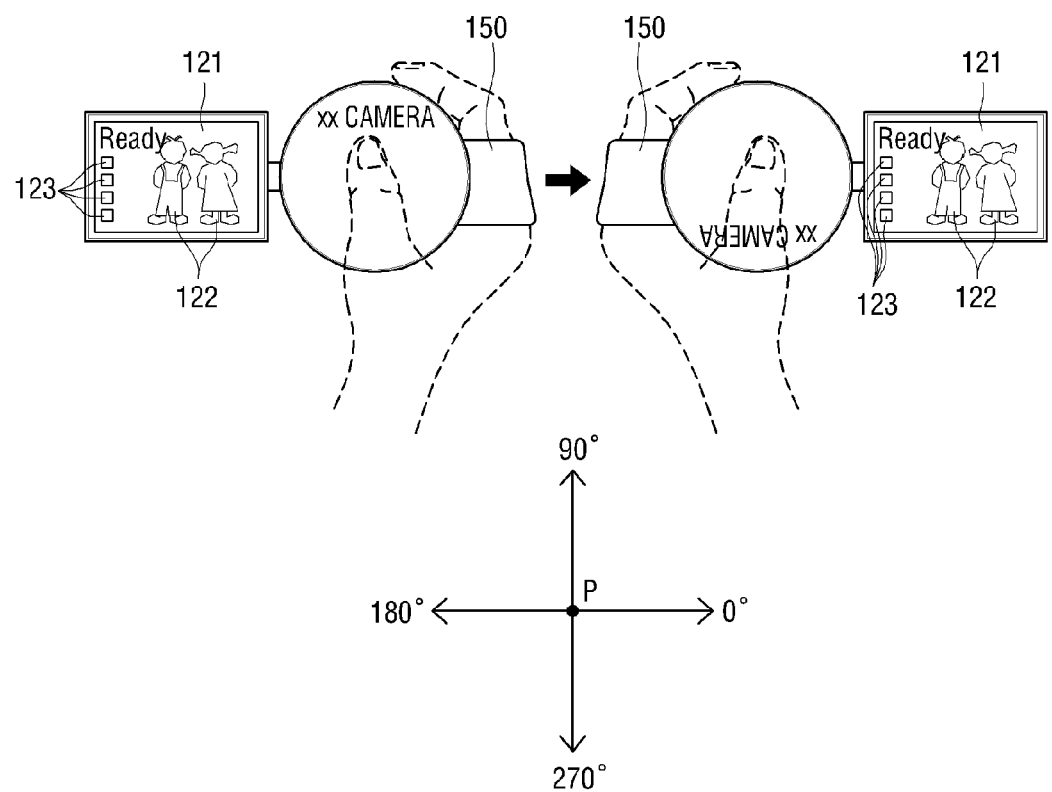
FIGS. 4A, 4B, and 5 are views showing a variety of examples of methods of displaying an icon if a grip is changed.
Figure 4B:
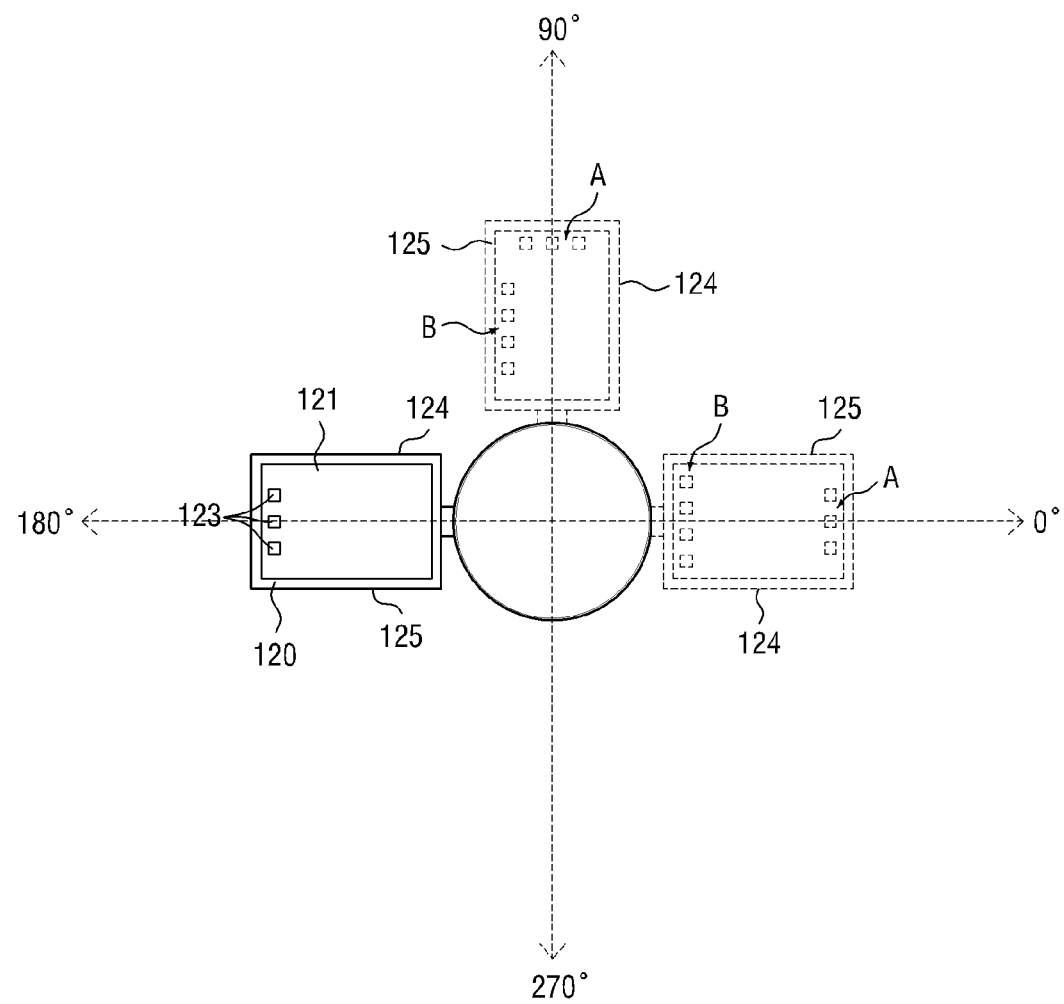

FIGS. 4A and 4B represent rotating the photographing device 100 from a right-handed grip state to a left-handed grip state.

As illustrated in FIG. 4A, if the photographing device 100 rotates at a 180° angle around a photographing axis P from a right-handed grip state, the grip unit 150 faces the left and the display unit 120 faces the right. A user may grasp the photographing device 100 by inserting a left hand into the grip unit 150.

When the photographing device 100 is rotated when in a recording stand-by state, an image that is captured when the photographing device 100 is changed to a recording state may be recorded such that it is later displayed by a display device to maintain its orientation in spite of its rotation. In addition, at least one of a display location and a display shape of the icon 123 may be changed according to the rotation direction and the rotation degree.

For example, when the grip unit 150 is in the right-handed grip position, as shown on the left side of FIG. 4A, then the icon 123 may be displayed on the left side of the screen 121. When the photographing device 100 is rotated when in a recording stand-by state, the icon 123 may change position, as illustrated in FIGS. 4A and 4B. For example, as illustrated in the center position of FIG. 4B, in which the screen 121 is vertical or aligned at 90 degrees with respect to the right-hand grip position, the icon 123 may either be arranged to stay at the left side of the screen 121 in position B, or the icon may be maintained at the outer-most edge of the screen 121 in position A, but the orientation of the icon may be changed to maintain the same orientation as in the right-handed grip position.

Similarly, when the photographing device 100 is rotated 180 degrees with respect to the right-handed grip position when in the recording stand-by state, the icon 123 may be maintained at the left side of the screen 121 in position B, or at the outer-most portion of the screen 121 in position A. In each case, the icon 123 may be rotated 180 degrees as the photographing device 100 is rotated, so that the icon 123 is right-side-up, even in the left-handed grip position. Although the above-described embodiments change the orientation of the icon 123 only in the recording stand-by state, the orientation may be changed in the recording state as well.

Alternatively, in case of the right-handed grip, the display location and display shape may be all changed so that a menu displayed on the top of the left screen may be displayed on the lowest portion of the right screen if rotation is completed.

Figure 5:
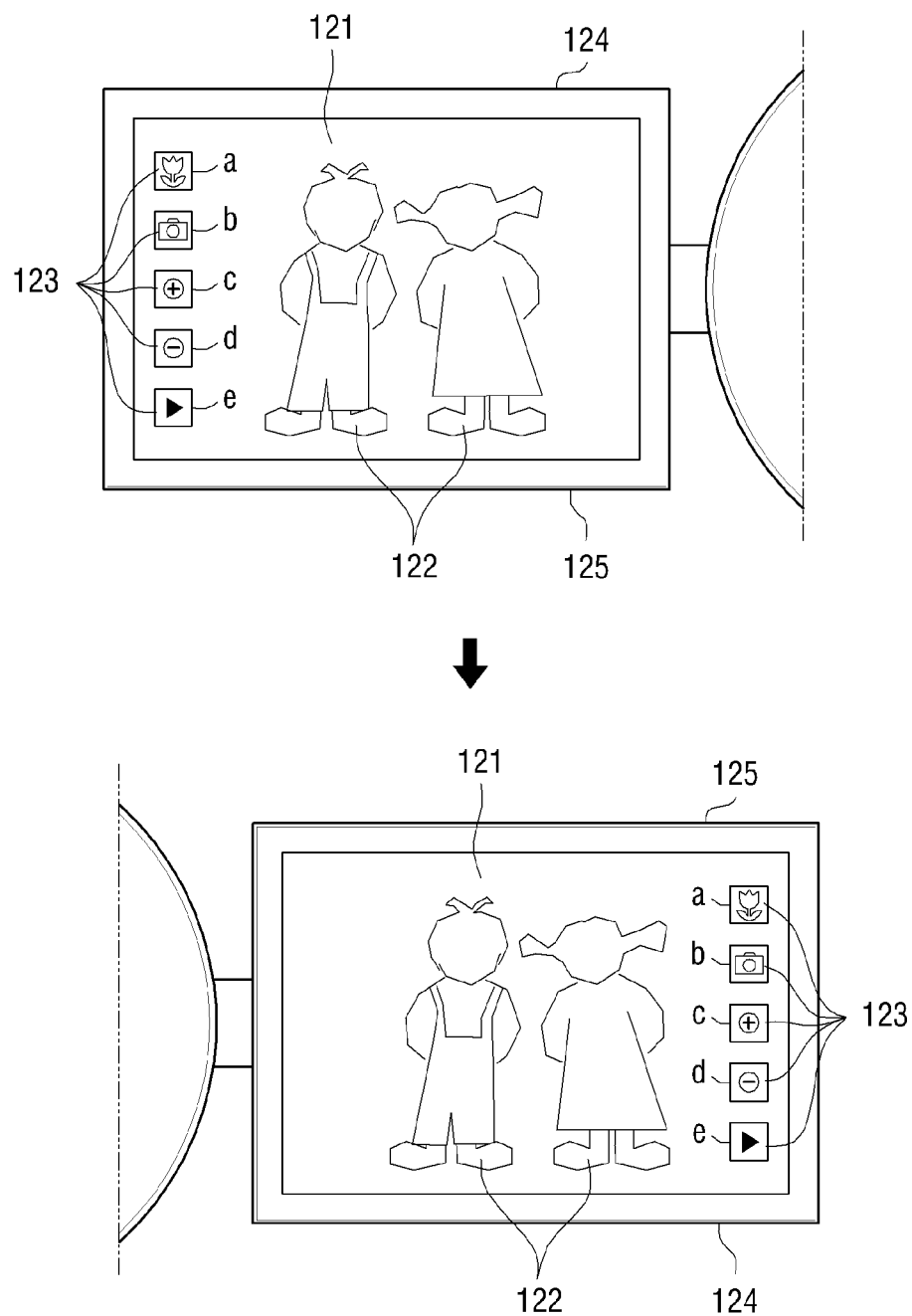

According to FIG. 5, if a variety of icons 123 is displayed on the left of the screen 121 in case of the right-handed grip, a variety of icons 123 on the right side of the screen 121 is displayed when the grip is changed into the left-handed grip by rotation.

As discussed above, although FIG. 5 illustrates an example in which the icons are maintained at an outer side of the screen 121, the icons may also be maintained at the left side of the screen 121 according to one embodiment of the general inventive concept. In the upper portion of FIG. 5, in which the photographing device is held in the right-handed grip, the icons 123 are arranged, from top to bottom, in the order a, b, c, d, e. In the right-handed grip position, a first side 124 of the display unit 120 is on top and a second side 125 is on the bottom. When the photographing device 100 is rotated 180 degrees to be positioned in the left-handed grip position, the order of the icons is changed, and the orientation of the icons is changed, to maintain the icons in the order a, b, c, d, e, and to maintain the icons right-side up. In the left-handed grip position, the icons may be arranged from icon a closest to the second side 125 through icon e closest to the first side 124.

As described above, in the case where rotation is occurred, it is possible to change the display location of the icon, or reverse the up side and the down side of the icon by changing only the display shape without changing the display location. Alternatively, the display location and the display shape may be changed at the same time.

Figure 6:
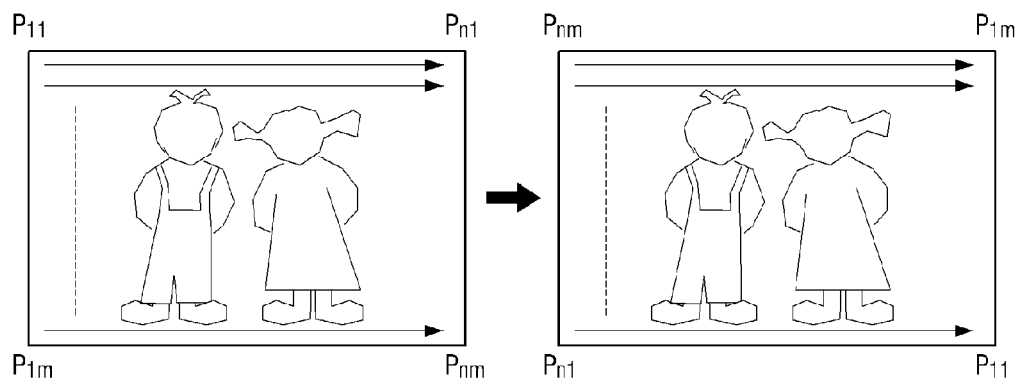
FIG. 6 is a view illustrating a reading order change of an photographing component when a photographing device is rotated for a left-handed grip.

FIG. 6 is a view showing a change of a reading order of the photographing component 121. Namely, if the photographing component 121 is an array image sensor as the left view of FIG. 6, in a normal case, or in case of the right-handed grip, a photographing value is read sequentially from P11 pixel to $P_{nm}$ pixel by moving in zigzag direction toward the right. The term "zigzag" refers to a line-by-line, left-to-right order. Although a left-to-right direction is used as an example, the values may be read in any particular order, such as right-to-left.

If the grip is changed into the left-handed grip by rotation of the photographing device 100 when the photographing device 100 is in the recording stand-by mode, a reading order is changed as illustrated in the right view of FIG. 6. Namely, a photographing value is read sequentially from $P_{nm}$ pixel to P11 pixel by moving toward the right and the lower directions in a zigzag shape, or line-by-line from left-to-right and from the top line to the bottom line. Accordingly, even though the photographing device is rotated, a normal photographing may be carried out.

If 180° angle rotation is occurred, a reset may be carried out in order to change the reading order of the image sensors.

In other cases except for the case of 180° angle rotation such as 90° angle rotation or 270° angle rotation, the reading order of the image sensors may be changed. For example, if the photographing device 100 has been rotated 90 degrees clockwise when in the recording stand-by mode, the photographing values of the photographing component 121 may be read left-to-right from $P_{1m}$ to $P_{11}$, and from a top line defined by the pixels $P_{1m}$ to $P_{11}$ to a bottom line defined by the pixels $P_{nm}$ to $P_{n1}$.

Figure 7:
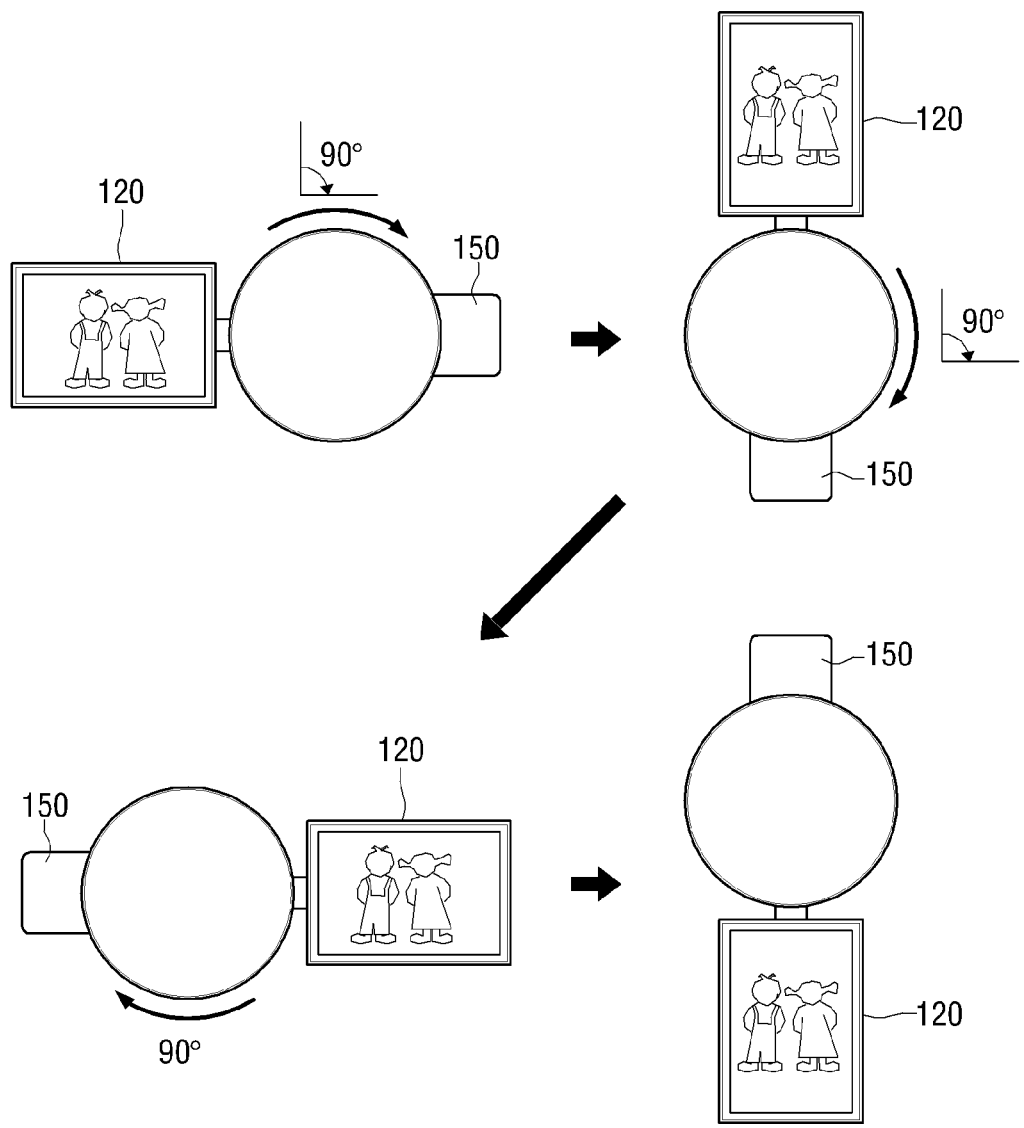
FIG. 7 is a view showing a state where the photographing device is rotated at various angles.

FIG. 7 illustrates a photographing device 100 that has been rotated at a variety of angles. According to FIG. 7, it is possible for the photographing device to adjust a photographing process to record images right-side-up, even when the photographing device 100 is located at a 90° angle or a 270° angle The right-hand grip position illustrated in the upper-left of FIG. 7 is defined as a 0 degree angle of rotation. Rotating the photographing device 100 at an angle of 90 degrees about the axis P, which axis corresponds to the photographing direction, results in the position illustrated in the upper-right of FIG. 7. In the lower-left portion of FIG. 7, the photographing device 100 is further rotated 90 degrees clockwise, or 180 degrees with respect to the right-hand position. This position may also be referred to as the left-hand position. The lower-right image of FIG. 7 illustrates the photographing device 100 further rotated 90 degrees, or 270 degrees with respect to the right-hand grip position.

When the photographing device 100 is rotated in the manner illustrated in FIG. 7 to be in any one of the 0 degree, 90 degree, 180 degree, or 270 degree positions while the photographing device 100 is the in recording stand-by state, the photographing device 100 may alter the photographing or image-capture operation to record the image right-side-up, regardless of the angle of the photographing device 100. On the other hand, when the photographing device 100 is rotated while the photographing device 100 is in the recording state, the photographing device may record the image so that the image has an angle corresponding to the angle of rotation of the photographing device 100. For example, if a user begins recording at an angle of 0, but rotates the photographing device 100 to be at a 90 degree angle while recording, the photographing device 100 may not adjust the image to record right-side up, but may record the image at a 90 degree angle corresponding to the rotated angle of the photographing device 100.

In the case where the photographing device is rotated and the grip location is changed, the functions of the control keys may be changed according to the grip location, as discussed above.

Figure 8:
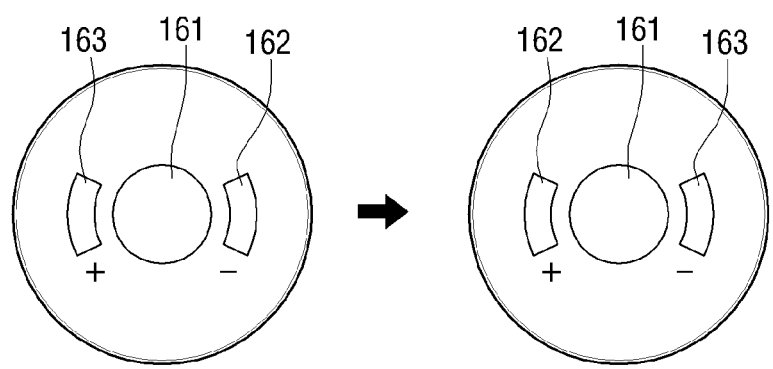
FIG. 8 is a view to describe a function change of a control key according to rotation of a photographing device.

FIG. 8 illustrates a case where the functions of the control keys are changed by rotation. As illustrated in FIG. 8, when the photographing device 100 is held in the right-handed grip position at the left side of FIG. 8, the first control key 162 located at the right side of the center key 161 may be mapped to the zoom-out (−) function, and the second control key 163 located at the left side of the center key 161 may be mapped to the zoom-in (+) function. However, when the photographing device 100 is rotated 180 degrees to be in the left-handed grip position as shown on the right side of FIG. 8, the first control key 162 may have the zoom-in (+) function and the second control key 163 may have the zoom-out (−) function.

Accordingly, although the grip location is changed, an arrangement of the control keys in an aspect of a function is not changed and thus, a user may not be confused.

As illustrated in FIG. 3, when the control keys are disposed on the up, down, left and right portions of the center key 161, functions may be exchanged between the control keys facing each other. Namely, if the photographing device 100 is rotated 180°, the control unit 140 may change functions mapped to the control keys so that the function of the first control key 162 and the function of the second control key 163 may be exchanged and the function of the third control key 164 and the function of the fourth control key 165 may be exchanged.

Figure 9:
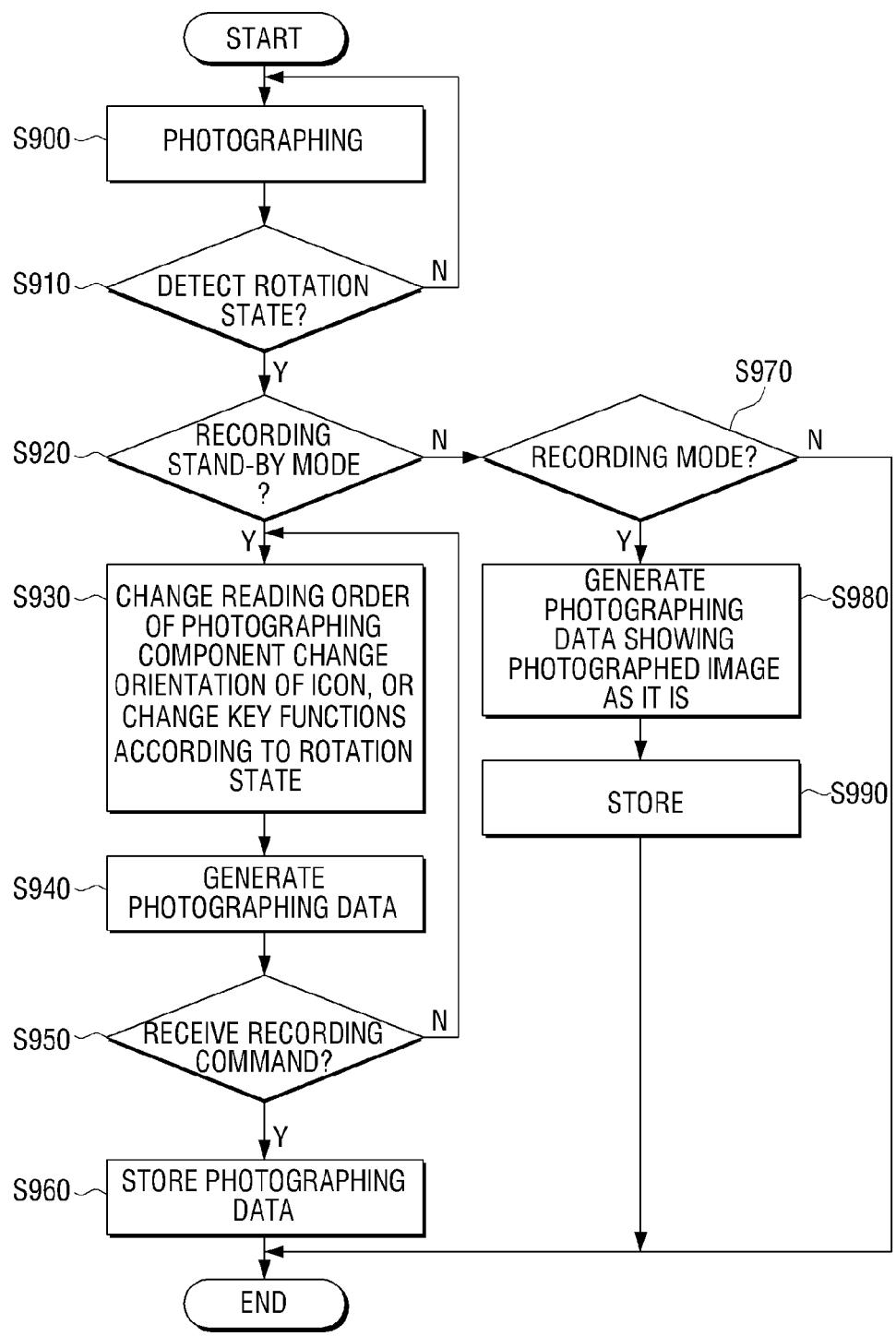
FIG. 9 is a flowchart to describe a photographing method of a photographing device according to a variety of exemplary embodiments of the present general inventive concept.

FIG. 9 is a flowchart to describe a photographing method of the photographing device according to an exemplary embodiment of the present general inventive concept. According to FIG. 9, a photographing device 100 may be turned on, or a photographing function of a multi-function device may be turned on, in operation S900. The device may detect in operation S910 whether a rotation detection mode has been selected. If the rotation detection mode has not been selected, the device may operate normally, by not changing the orientation of control keys, icons, or recorded data based on a rotation angle of the device in a recording stand-by state.

However, if the rotation detection mode is selected in operation S910, the recording stand-by state may be detected in operation S920. If the current operation mode is determined in operation S920 to be a recording stand-by mode, a reading order of the photographing component may be changed, control key functions may be changed, or displayed icons may be arranged in operation S930 according to a detected rotation state. In operation S940, photographing data may be generated.

If a recording command is received in the recording stand-by state in operation S950, the generated photographing data is stored in operation S960. Accordingly, a left-hander may photograph by rotating the photographing device at 180° angle and grasping the photographing device with a left hand. In this case, an image of the photographing data is recorded in the normal direction, or right-side up, since the reading order of the photographing component was changed in operation S930 to correspond to the rotated position of the device.

If it is determined in operation S920 that the stand-by mode is not selected, and if it is further determined in operation S970 that the recording mode is selected, then photographing data is generated in operation S980 without changing the reading order of the photographing component. Therefore, in case of the rotation at a 180° angle, a photographing data with respect to the image reversed upside down is generated and stored in operation S990.

As described above, the present method may display the display location, the display shape, and the direction of icons that are changed in accordance with a rotation state of a photographing device.

In the above exemplary embodiments regarding the device and methods, the reading order is changed only in case of the recording stand-by mode, but not limited to this case.

Namely, in a certain exemplary embodiment, the reading order may be directly changed if rotation is occurred regardless of a mode. In such a case, the photographed image may be maintained right-side up during recording, even if the photographing device is rotated during recording.

In another exemplary embodiment, if rotation is occurred, an interface window that inquires of a user whether to change a mode into the left-hander mode changing the reading order may be displayed. A user may give an instruction on an interface window whether to change a mode via a key control or a screen touch control and accordingly, a reading order may be changed and recorded only in the case where the user gives instructions to change a mode into the left-hander mode.

In another exemplary embodiment, the mode may be set in advance when the functions of the photographing device are set. Namely, the mode maybe set in the right-hander mode in case of the right hander and the mode maybe set in the left-hander mode in case of the left-hander. Accordingly, the photographing data to which the reading order is applied according to the set mode may be generated even though rotation occurs.

As described above, if a grip is changed due to rotation, the photographing device changes the reading order of the photographing components, thereby achieving a normal photographing. In this case, it is possible to achieve the normal photographing by reversing of the photographing image with software without changing the reading order. Especially, in case of the photographing device photographing a still image, a photographing component may be read in the original reading order with respect to an image photographed in a changed left-handed grip state and then, the read result data may be reversed with software and recorded.

A program code for carrying out the photographing method may be stored in a variety of recording media. Specifically, the program code may be stored in a variety of recording media readable by a terminal such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, a memory card, and a USB memory.

Accordingly, if the recording medium where the above described program codes are recorded is connected to or mounted on the photographing device, the above described photographing method may be provided.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A photographing device, comprising:
    a photographing unit which generates a photographing data by performing photographing with a photographing component;
    a display unit which displays an image which is photographed in the photographing unit;
    a sensor unit which senses whether the photographing device rotates;
    a control unit which changes a reading order of the photographing component according to a rotation direction and rotation degree in response to the photographing device rotating while in a recording stand-by mode state, and controls the photographing unit in order to generate the photographing data by maintaining the reading order if the photographing device rotates while in a recording mode state; and
    a plurality of control keys having functions mapped thereto such that the functions are changed based on and in response to the sensor sensing a change in the rotation direction and the rotation degree of the photographing device without requiring a button to be pushed to change the functions,
    wherein the control unit automatically changes or maintains the reading order when mode state changes between the recording stand-by mode state and recording mode state.

2. The photographing device of claim 1,
    wherein the display unit displays an icon with the image, and
    wherein the control unit controls the display unit so that at least one of a display location and a display direction of the icon is changed according to the rotation direction and rotation degree, when the photographing device rotates in the recording stand-by mode state.

3. The photographing device of claim 2, further comprising:
    a grip unit which is disposed on a first side of the photographing device;
    wherein the plurality of control keys are disposed on a rear side of the photographing device,
    wherein the display unit is disposed on a second side which is opposite the grip unit.

4. The photographing device of claim 3,
wherein the plurality of control keys are disposed in a bilaterally symmetrical shape.

5. The photographing device of claim 3,
wherein the plurality of control keys comprise:
a center key which is disposed on a center of the rear side;
a first control key which is disposed toward the first side with respect to the center key on the rear side;
a second control key which is disposed toward the second side with respect to the center key on the rear side;
a third control key which is disposed on an upper portion with respect to the center key on the rear side; and
a fourth control key which is disposed on a lower portion with respect to the center key on the rear side,
wherein the control unit changes functions which are mapped to the plurality of control keys so that a function of the first control key and a function of the second control key are exchanged and a function of the third control key and a function of the fourth control key are exchanged when the photographing device rotates at a 180° angle.

6. The photographing device of claim 1, further comprising:
a sliding button on the rear side of the photographing device,
wherein the sliding button is located on a center portion of a groove which is provided on a rear side of the photographing device and is slidable in one direction or in another direction along the groove and returns to the center portion when a sliding is completed,
wherein the control unit performs zoom-in or zoom-out according to a sliding direction when the sliding is carried out, and
wherein functions which are mapped to the sliding direction are changed if the photographing device is rotated at a 180° angle.

7. The photographing device of claim 1, wherein the control unit rotates the reading order at one angle among a 90° angle, a 180° angle, and a 270° angle, according to the rotation direction and the rotation degree of the photographing device in the recording stand-by mode.

8. The photographing device of claim 1, further comprising:
a storing unit,
wherein a first photographing data which is generated by photographing values which are read according to the reading order is stored in the storing unit when the photographing device rotates in the recording mode state, and a second photographing data is generated by photographing values which are read according to the changed reading order and the second photographing data is stored in the storing unit when a recording command is input in the recording stand-by mode state,
wherein the first photographing data depicts a rotation image which is rotated according to a rotation direction and a rotation degree of the photographing device, and
wherein the second photographing data depicts a normal image which is displayed normally by compensating for a rotation of the photographing device.

9. A method of photographing of a photographing device, comprising:
performing photographing by using a photographing component;
detecting a rotation state that the photographing device rotates around a photographing direction;
generating photographing data by changing a reading order of the photographing component according to a rotation direction and a rotation degree when the photographing device is in a recording stand-by mode state and maintaining a reading order of the photographing component when the photographing device is in a recording mode state;
mapping functions to a plurality of control keys disposed on the photographing device; and
changing the functions of the plurality of control keys based on and in response to the sensor sensing a change in the rotation direction and the rotation degree of the photographing device without requiring a button to be pushed to change the functions, wherein the control unit automatically changes or maintains the reading order when mode state changes between the recording stand-by mode state and recording mode state.

10. The method of photographing of a photographing device of claim 9, further comprising:
displaying an icon and an image which is photographed; and
changing at least one of the display location and the display direction of the icon according to the rotation direction and the rotation degree when the photographing device rotates in the recording stand-by mode state.

11. The method of photographing of a photographing device of claim 10, further comprising:
key changing which changes functions that mapped to a plurality of control keys that are disposed on the rear side of the photographing device according to the rotation direction and the rotation degree when the photographing device rotates in the recording stand-by mode state.

12. The method of photographing of a photographing device of claim 11,
wherein the plurality of control keys comprise a center key which is disposed on a center of the rear side, a first control key which is disposed toward a first side with respect to the center key on the rear side, a second control key which is disposed toward a second side with respect to the center key on the rear side, a third key which is disposed on an upper portion with respect to the center key on the rear side, and a fourth key which is disposed on a lower portion with respect to the center key on the rear side,
wherein the key changing exchanges a function of the first control key and a function of the second control key, and exchanges a function of the third control key and a function of the fourth control key when the photographing device rotates at a 180° angle.

13. The method of photographing of a photographing device of claim 9, further comprising:
changing a sliding direction of a sliding button on the rear side of the photographing device and functions mapped to the sliding direction when the photographing device rotates at 180° angle,
wherein the sliding button which is located on a center portion of a groove which is provided on the rear side of the photographing device is slidable in one direction or in another direction along the groove, instructs to perform zoom-in or zoom-out according to a sliding direction, and returns back to the center portion when the sliding is completed.

14. The method of photographing of a photographing device of claim 9,
wherein the generating rotates the reading order at one angle among a 90° angle, a 180° angle, and a 270° angle, according to the rotation direction and the rotation degree of the photographing device when the photographing device rotates under the recording stand-by mode.

15. The method of photographing of a photographing device of claim 9, further comprising:
storing a first photographing data which is generated by photographing values which are read according to the reading order when the photographing device rotates in the recording mode state, and generating and storing a second photographing data by photographing values which are read according to the changed reading order when a recording command is input in the recording stand-by mode,
wherein the first photographing data depicts a rotated image which is rotated according to the rotation direction and rotation degree of the photographing device, and
wherein the second photographing data depicts a normal image which is displayed normally by compensating for rotation of the photographing device.

16. A method of photographing of a photographing device which has a grip unit which is disposed on a first side and a display unit which is disposed on a second side which is opposite side to the first side, the method comprising:
determining whether a grip of the photographing device is changed by a rotation of the photographing device at a 180° angle around a photographing direction axis;
determining a mode of the photographing device when the grip of the photographing device is changed;
generating and storing a photographing data by using photographing values which are generated from a photographing component which is provided in the photographing device when the photographing device is in a recording mode state, and generating a photographing data by reading photographing values which are generated from the photographing component in a reverse direction when the photographing device is in a recording stand-by mode state;
mapping functions to a plurality of control keys disposed on the photographing device;
changing the functions of the plurality of control keys based on and in response to a change in the rotation direction and the rotation degree of the photographing device without requiring a button to be pushed to change the functions; and
displaying the photographing data and at least one icon of which a display location and a display direction are changed according to a rotation state of the photographing device, wherein the control unit automatically changes or maintains the reading order when mode state changes between the recording stand-by mode state and recording mode state.

17. A photographing device, comprising:
a photographing unit to receive an image and to output electrical signals corresponding to the received image using a photographing component;
a sensor to detect a rotation angle of the photographing device around an axis corresponding to a photographing direction;
a controller to change an orientation at which the received image is stored according to a detected rotation angle of the sensor by changing a reading order of the photographing component; and
a plurality of control keys having functions mapped thereto such that the functions are changed based on and in response to the sensor detecting a change in the rotation angle of the photographing device without requiring a button to be pushed to change the functions, wherein the control unit automatically changes or maintains the reading order when mode state changes between the recording stand-by mode state and recording mode state.

18. The photographing device of claim 17, wherein the controller changes the orientation of the received image by changing an order in which the electrical signals are read from the photographing unit.

19. The photographing device of claim 18, further comprising:
a storing unit to store the received image by storing the electrical signals from the photographing unit,
wherein the controller detects a mode of the photographing device and stores the electrical signals to the storing unit without changing the order in which the electrical signals are read from the photographing unit when the photographing device is in a recording mode, and the controller changes the order in which the electrical signals are read from the photographing unit without storing the electrical signals in the storing unit when the photographing device is in a recording stand-by mode.

20. The photographing device according to claim 18, wherein the controller reverses an order in which the electrical signals are read from the photographing unit when the sensor detects a rotation angle of at least a predetermined degree.

21. The photographing device according to claim 20, wherein the predetermined degree is one of 90 degrees and 180 degrees.

22. A photographing device, comprising:
a photographing unit to receive an image and to output electrical signals corresponding to the received image using a photographing component;
a sensor to detect a rotation angle of the photographing device around an axis corresponding to a photographing direction;
a display to display a photographed image and at least one display feature;
a controller to change an orientation of at least one of the display feature and a recorded image according to the detected rotation angle of the photographing device by changing a reading order of the photographing component; and
a plurality of control keys having functions mapped thereto such that the functions are changed based on and in response to the sensor detecting a change in the rotation angle of the photographing device without requiring a button to be pushed to change the functions, wherein the control unit automatically changes or maintains the reading order when mode state changes between the recording stand-by mode state and recording mode state.

23. The photographing device of claim 22, wherein the display feature includes an icon displayed on the display.

24. The photographing device of claim 23, wherein the controller changes the orientation of at least one of the icon and the recorded image when the photographing device is in a recording stand-by mode according to the detected rotation angle of the photographing device.

25. The photographing device of claim 24, wherein the controller changes the orientation of the icon according to the detected rotation angle of the photographing device when the photographing device is in a recording mode, and the controller does not change the orientation of the recorded image according to the detected rotation angle of the photographing device when the photographing device is in the recording mode.

26. The photographing device of claim 23, wherein the controller changes the location of the icon on the display according to the detected rotation angle of the photographing device.

27. A photographing device, comprising:
a photographing unit to receive an image and to output electrical signals corresponding to the received image using a photographing component;
a sensor to detect a rotation angle of the photographing device around an axis corresponding to a photographing direction;
a plurality of keys having functions mapped thereto and located on a rear surface of the photographing device opposite the photographing unit to control the photographing device; and
a controller to change functions assigned to the plurality of keys and a recorded image based on and in response to the sensor detecting a change in the rotation angle of the photographing device by changing a reading order of the photographing component without requiring a button to be pushed to change the functions, wherein the control unit automatically changes or maintains the reading order when mode state changes between the recording stand-by mode state and recording mode state.

28. The photographing device of claim 27, wherein the keys are located symmetrically with respect to a first axis and a second axis perpendicular to the first axis, and
a function of a first key and a second key of the plurality of keys are switched with each other when the controller determines that the photographing device is rotated to a predetermined degree, the first key and the second key being symmetrical with each other with respect to at least one of the first and second axes.

29. The photographing device of claim 27, wherein the plurality of keys includes a multi-part key including at least a first part to perform a first function and a second part to perform a second function, and
a function of the first part and the second part of the multi-part key are switched with each other when the controller determines that the photographing device is rotated to a predetermined degree, the first part and the second part being symmetrical with each other with respect to at least one of the first and second axes.

30. The photographing device of claim 29, wherein the multi-part key is a sliding key that performs a first function when slid in a first direction and performs a second function when slid in a second direction opposite the first direction.

31. A photographing device, comprising:
a photographing unit to receive an image and to output electrical signals corresponding to the received image by using a photographing component;
a sensor to detect a rotation angle of the photographing device around an axis corresponding to a photographing direction;
a plurality of keys having functions mapped thereto and located on a rear surface of the photographing device opposite the photographing unit to control the photographing device;
a display to display the received image;
a storage unit to store the received image when the photographing device is in a recording mode; and
a controller to change at least one of an orientation of an icon displayed on the display and an orientation of a recorded image according to the detected rotation angle of the photographing device by changing a reading order of the photographing component, and to change functions assigned to the plurality of keys and based on and in response to the sensor detecting a change in the rotation angle of the photographing device without requiring a button to be pushed to change the functions, wherein the control unit automatically changes or maintains the reading order when mode state changes between the recording stand-by mode state and recording mode state.

32. The photographing device of claim 31, wherein the controller determines whether the photographing device is in the recording mode or a stand-by mode and changes the at least one of functions assigned to the plurality of keys, the orientation of an icon displayed on the display, and the orientation of a recorded image according to the detected rotation angle of the photographing device only when the photographing device is in the recording stand-by mode.

33. The photographing device of claim 31, wherein the controller changes the orientation of the recorded image by changing an order in which the electrical signals are read from the photographing unit into the storage unit.

34. A method of controlling a photographing device, comprising:
detecting a rotation angle of the photographing device by using a photographing component;
changing at least one of an orientation of an icon displayed by the photographing device and an orientation of an image recorded by the photographing device according to the detected rotation angle of the photographing device by changing a reading order of the photographing component;
mapping functions to a plurality of keys disposed on the photographing device; and
changing the functions of the plurality of keys based on and in response to the photographing component detecting a change in the rotation angle of the photographing device without requiring a button to be pushed to change the functions, wherein the control unit automatically changes or maintains the reading order when mode state changes between the recording stand-by mode state and recording mode state.

35. The method of claim 34, wherein changing the orientation of the image recorded by the photographing device includes changing an order in which electrical signals corresponding to a received image are read from a photographing unit into a storage unit to store the received image.

36. The method of claim 34, wherein changing at least one of functions assigned to the plurality of keys includes switching the functions of keys located on a rear surface of the photographing device opposite a front surface that receives an image to be recorded, the keys being symmetrical to each other on the rear surface of the photographing device.

37. The method of claim 34, wherein changing at least one of functions assigned to the plurality of keys includes changing the functions assigned to first and second parts of a multi-part key, the first and second parts being symmetrical to each other on the rear surface of the photographing device.

38. The method of claim 34, wherein changing an orientation of an icon displayed by the photographing device includes changing an order in which a plurality of icons are displayed on a display of the photographing device.

* * * * *